Jan. 31, 1950          W. F. McSPARRAN, JR          2,495,979
              PARKING BRAKE ACTUATOR AND CONTROL
Filed Feb. 25, 1949                              3 Sheets-Sheet 1
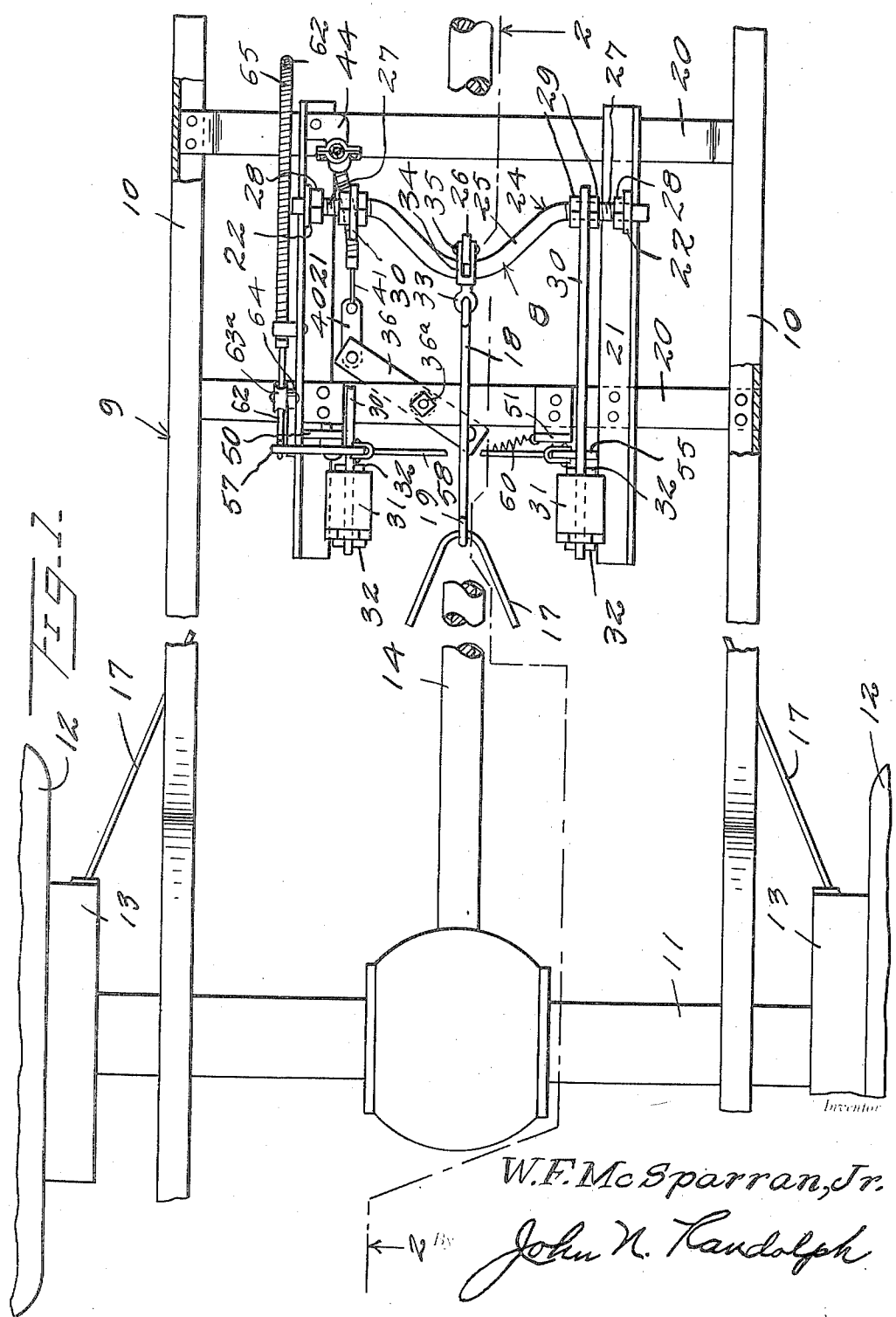
Inventor
W. F. McSparran, Jr.
By John N. Randolph
Attorney

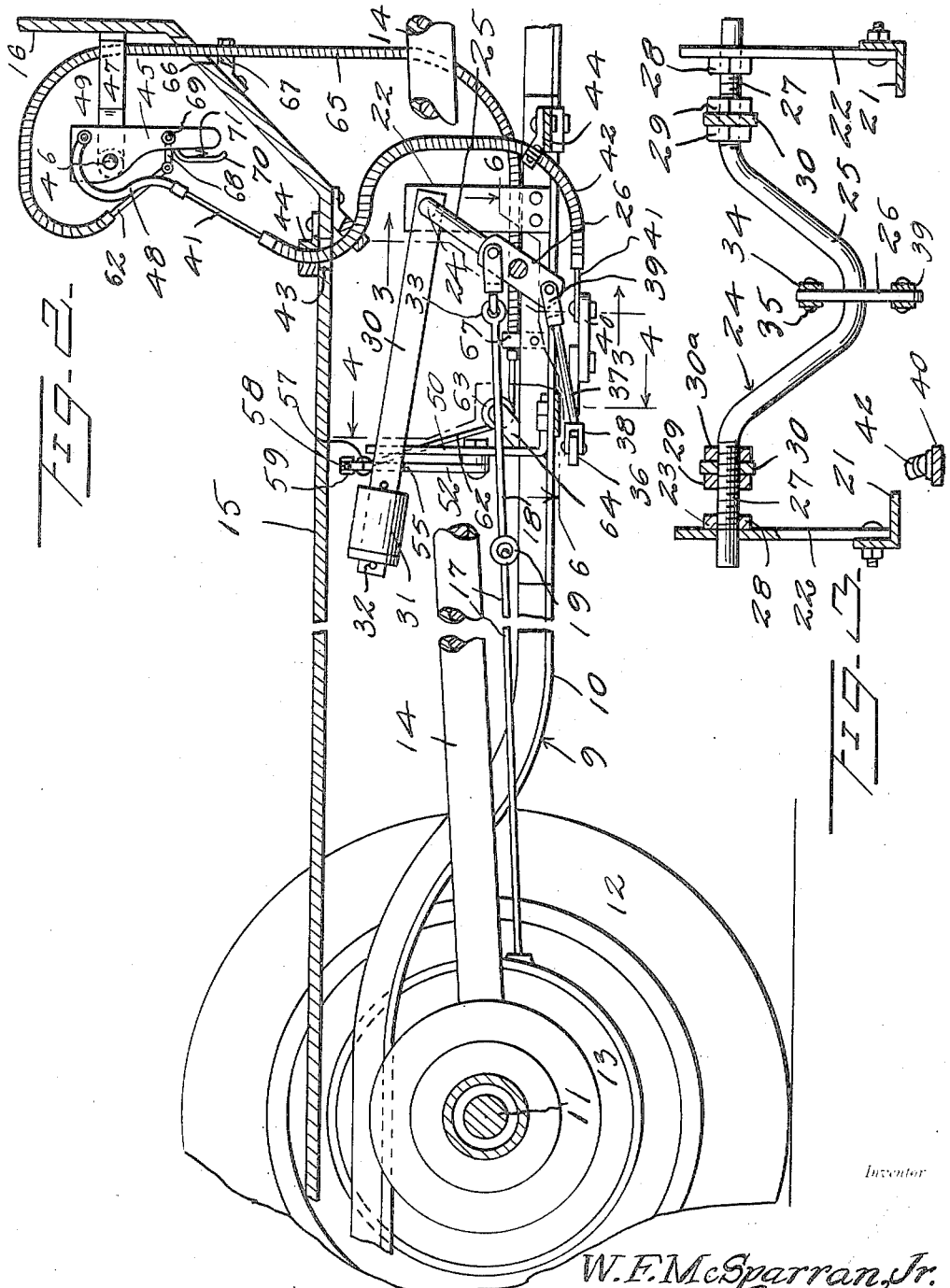

Jan. 31, 1950
W. F. McSPARRAN, JR
2,495,979
PARKING BRAKE ACTUATOR AND CONTROL
Filed Feb. 25, 1949
3 Sheets-Sheet 3
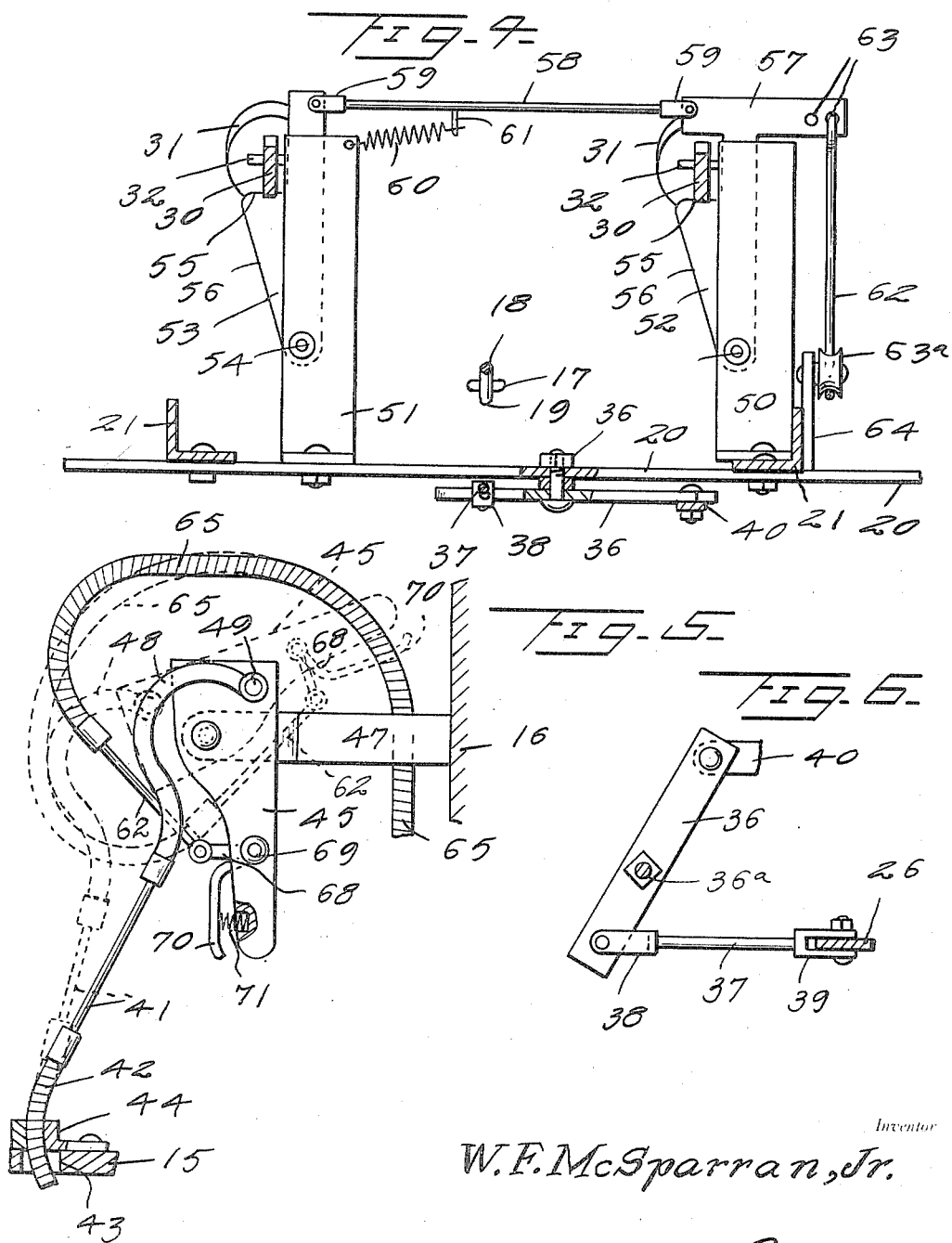
Inventor
W. F. McSparran, Jr.
By John N. Randolph
Attorney Patented Jan. 31, 1950

2,495,979

UNITED STATES PATENT OFFICE 2,495,979

PARKING BRAKE ACTUATOR AND CONTROL

William F. McSparran, Jr., Kennett Square, Pa.

Application February 25, 1949, Serial No. 78,452

6 Claims. (Cl. 188—174)

This invention relates to a novel parking brake control and actuator for motor vehicles and has for its primary object to provide manually releasable gravity actuated means for applying and holding the parking brakes of a motor vehicle in an applied position thereby eliminating the possibility of the conventional latch on a motor vehicle hand brake inadvertently releasing.

Another object of the invention is to provide a parking brake actuator which will automatically adjust itself to exert sufficient force for holding the parking brakes in substantially a locked position until the device is manually moved to a position for releasing the parking brakes.

A further and important object of the invention is to provide a parking brake actuator which will minimize the manual effort required in actuating the parking brake and which will insure, whenever the brake actuating mechanism is released, that the brakes will be sufficiently applied to hold the vehicle even on very steep slopes.

Still another object of the invention is to provide a positive parking brake control and actuator which may be quickly and easily mounted on motor vehicles to replace the manually actuated means conventionally used to apply the parking brakes and which may be readily substituted therefore on motor vehicles being manufactured.

Various other objects and advantages of the invention will hereinafter become more fully apparent from the following description of the drawings, illustrating a presently preferred embodiment thereof, and wherein:

Figure 1 is a fragmentary plan view of the chassis of a motor vehicle showing the parking brake actuator and control applied thereto;

Figure 2 is a longitudinal sectional view thereof taken substantially along a plane as indicated by the line 2—2 of Figure 1;

Figure 3 is an enlarged transverse vertical sectional view taken substantially along a plane as indicated by the line 3—3 of Figure 2;

Figure 4 is a transverse vertical sectional view taken substantially along a plane as indicated by the line 4—4 of Figure 2;

Figure 5 is an enlarged side elevational view, partly in vertical section showing in detail the manually actuated means of the device, and Figure 6 is a horizontal sectional view taken substantially along a plane as indicated by the line 6—6 of Figure 2.

Referring more specifically to the drawings, for the purpose of illustrating a preferred application and use of the parking brake actuator and control, designated generally 8 and comprising the invention, a portion of the chassis of a motor vehicle is illustrated particularly in Figures 1 and 2 and is designated generally 9 and includes the longitudinally extending side sills or frame members 10, the rear axle 11, rear wheels 12 equipped with conventional brakes, indicated generally at 13, the longitudinally extending propeller shaft housing 14, the floor board 15 and dashboard 16. The brakes 13 of the rear wheels 12 as is conventional also constitute the parking brakes of the vehicle 9 and which are actuated by a cable or flexible member 17 the ends of which extend into the housing of the brakes 13 and function in a conventional manner, not disclosed, for applying said brakes 13 when a pull is exerted on the ends of the cable or flexible member 17 in a direction forwardly of the vehicle 9. The intermediate portion of the cable 17 is normally engaged by a link or other connection leading to the hand brake of the vehicle, not shown, but in lieu thereof the parking brake actuator and control 8 is provided with an elongated rod 18 which is preferably provided with an eye 19 at its rear end through which the intermediate portion of the cable 17 slidably extends and by means of which the brake actuating cable 17 is connected to the actuator and control 8, as will hereinafter be more fully described.

The actuator and control 8 includes a pair of longitudinally spaced cross beams 20 which are supported at their ends fixedly on the sills 10 and which provide supports for a pair of longitudinally extending substantially parallel beams 21 which are secured thereto and which are spaced inwardly from the sills 10. The beams 21 are preferably formed of angle iron and have rear portions extending rearwardly beyond the rearmost cross member 20. A post 22 is fixed to and rises from each beam 21 near its forward end and between the cross beams 20. The posts 22 are provided with transversely aligned apertures 23 adjacent their upper ends for journaling the end portions of a shaft 24 which is provided with a downwardly offset intermediate portion forming a crank 25 to which a bar 26 is fixedly secured intermediate of its ends and with one end projecting upwardly with respect to the crank portion 25 and the other end extending downwardly therefrom, as clearly illustrated in Figures 2 and 3. The shaft 24 is provided with a threaded portion 27 between each of its journaled ends and the adjacent end of crank portion 25 and each of which threaded portions 27 has a nut 28 mounted thereon. The nuts 28 are adjustable on the threaded portions 27 and are adapted to engage the adjacent sides of the posts 22 to prevent sliding movement of the shaft 24 relatively to said posts. Each of the threaded portions 27 also carries a pair of clamping nuts 29 between which is clamped an end of an elongated arm 30 and which end is provided with an opening 30a through which the threaded portions 27 extend. As seen in Figures 1 and 2, the arms 30 extend rearwardly from the shaft 24 and are clamped to said shaft so as to be disposed at an angle of approximately 70° or 75° to the crank 25, as best seen in Figure 2. The arms 30, preferably adjacent their rear ends, carry weights 31 which are detachably retained thereon by pins or other fastening means 32 between which the weights 31 are disposed and which engage and preferably extend through said arms 30.

The link 18 is provided with an eye at its forward end which is connected to a swivel 33 which extends rearwardly from a clevis 34. The clevis 34 is pivotally connected by a pin or the like 35 to the upper end of the bar 26. A lever 36 is swingably supported on the underside of the rear cross beam 20 by a fastening 36a for swinging movement in substantially a horizontal plane. A rod or link 37 is connected by a clevis 38 at its rear end to one end of the lever 36 and on one side of the pivot 36a thereof and said rod 37 is provided with a clevis 39 at its opposite end by which said last mentioned, forward end is pivotally connected to the lower end of the bar 26. A link 40 is pivotally connected at one of its ends to the opposite end of the lever 36 and on the other side of the pivot 36a and extends forwardly therefrom and has its forward end pivotally connected to one end of a wire or the like 41 which extends slidably through a tubular flexible housing 42. The housing 42 containing the wire 41 extends upwardly through an opening 43 in the floor board 15 and is supported at a plurality of points by clamps 44 which are supported by the vehicle chassis and floor board.

A manually actuated parking brake releasing lever 45 is pivotally mounted at 46 adjacent one end thereof on a bracket arm 47 which is fastened to and extends rearwardly from the dashboard 16. A rigid yoke 48 is pivotally connected at one of its ends at 49 to a corner of the end of the lever 45 located adjacent the pivot 46 and has an arcuate portion extending from its pivoted end and which extends around the pivot 46 when the lever 45 is in its position of Figure 2. The opposite end of the wire 41 projects from the last mentioned end of the flexible tube 42 and is fastened to the opposite, free end of the yoke 48, as best seen in Figure 2.

A post 50 is secured to and rises from one of the longitudinal beams 21 and a corresponding post 51 is secured to and rises from the rear cross beam 20. The posts 50 and 51 are disposed in transverse alignment and adjacent to and on corresponding sides of the arms 30 and are positioned with their planes transversely of the vehicle chassis 9. A pair of latch members 52 and 53 are pivotally supported on the rear sides of the posts 50 and 51, respectively, as best seen in Figure 4 by pivot pins 54 which engage the lower portion of said latch members 52 and 53. The latch members 52 and 53 are provided with corresponding upwardly facing shoulders 55 on which the arms 30 are adapted to rest for supporting said arms and the weights 31 carried thereby when the parking brakes are in a released position. Said latch members 52 and 53 are provided with corresponding splined edges 56 which extend downwardly and inwardly from the outer ends of the shoulders 55 toward the posts 50 and 51, for a purpose which will hereinafter become apparent. The latch members 52 and 53 extend to above the upper ends of the posts 50 and 51 and the latch member 52 is provided at its upper end with a cross head 57 the inner end of which is connected to the upper end of the latch member 53 by a rod or link 58 which is provided with clevises 59 at the ends thereof which are pivotally connected to the latch members. A contractile spring 60 is anchored at one end to the upper end of the post 51 and has its opposite end connected to a depending projection 61 of the link 58 for urging said link from right to left as seen in Figure 4 for causing the latch members 52 and 53 to be rocked to the left, as seen in Figure 4, or into position for positioning the shoulders 55 thereof for engagement beneath the weight supporting arms 30.

A cable of flexible member 62 is selectively connected to one of a plurality of openings 63 in the outer end of the cross head 57 and extends downwardly therefrom and around the underside of a pulley 63a which is supported on an arm 64 which rises from the adjacent beam 21.

As seen in Figures 1 and 2, the flexible member or cable 62 extends forwardly from the pulley 63a reciprocally through a flexible tube or housing 65 which extends forwardly and upwardly through an opening 66 in the upwardly inclined floor board portion and then around and over the lever 45, as seen in Figures 2 and 5. The tubular housing 65 is supported at a plurality of points by clamps 67 which are fastened to the chassis and floor board. The opposite end of the cable 62 extends from the opposite end of the flexible tubing 65 and is pivotally connected to an arm 68 which projects from the pivoted end 69 of a small lever 70 which is pivotally mounted on the lever 45 adjacent the end thereof which is remote to the pivot 46. A spring 71 of the expansion type which is disposed between the levers 45 and 70 urges said lever 70 outwardly relatively to the lever 45 and so as to cause the lever 70 and its arm 68 to rock in a direction to slack off the tension on the cable 62.

Assuming the parts to be disposed in the positions as illustrated in Figure 2, when the arms 30 are thus supported on the shoulders 55 of the latch members 52 and 53 the parking brake is in a released position so that the vehicle may be driven. In order to apply the parking brakes, the operator of the vehicle grasps the lower end of the lever 45, as seen in Figure 2, together with the lever 70, which levers are disposed in a position convenient to the vehicle operator, and by gripping the levers 45 and 70, said lever 70 will be rocked counterclockwise on its pivot 69 for exerting a pull on the cable 62 so as to rock the latch members 52 and 53 in a clockwise direction as seen in Figure 4 for moving the shoulders 55 thereof out of engagement with the weight carrying arms 30. When this occurs, the arms 30 will swing downwardly and at the same time that the levers 45 and 70 are gripped, the lever 45 is swung in a counterclockwise direction on its pivot 46 as seen in Figures 2 and 5, from its full line to its dotted line position so as to slack off the flexible member or wire 41 to permit the lever 36 to rock counterclockwise as seen in Figures 1 and 6 as a pull is exerted on the link 37 in a forward direction by the downward swinging movement of the weighted arms 30 and which causes the shaft 24 to turn in a counterclockwise direction as seen in Figure 2, and which will cause its crank 25 to swing downwardly and forwardly to also exert a pull on the link 18 to thereby exert a forward pull on the end of the parking brake cable 17 for applying the parking brakes of the vehicle. The extent of downward swinging movement of the arms 30 is relatively slight as if they swing through an arc of from 10° to 15°, this is normally sufficient to apply and substantially lock the parking brakes. Accordingly, the crank 25 will ordinarily not swing downwardly and forwardly from its position of Figure 2 to a point beyond a bottom dead center position. It will be noted that the crank 25 additionally forms an offset for accommodating the propeller shaft and its housing 14. The weights 31 are sufficient to hold the parking brakes applied with sufficient force to prevent the wheels 12 from turning even if the vehicle is parked on a very steep slope and will effectively function to prevent the vehicle from being started and moved without releasing the brakes thereby eliminating the possibility of the vehicle being driven with the parking brakes applied. Furthermore, very little effort is required to release or apply the parking brakes so that the lever 45 can be easily operated by any one capable of driving a vehicle. Furthermore, it will be readily obvious that the arms 30 may be made in various lengths and weights 31 of various sizes may be employed and may be mounted at various positions along said arms to exert sufficient force on the shaft 24 for effectively applying the parking brakes to any motor vehicle including heavy trucks.

To release the parking brakes the lever 45, in its dotted line position of Figure 5, is grasped by its smaller end and swung downwardly and rearwardly in a clockwise direction from its dotted line to its full line position and without gripping the lever 70 so that a pull will be exerted on the lever 36 through the link 40 and the flexible member 41 for swinging the shaft 24 clockwise as seen in Figure 2 so that the arms 30 will be swung upwardly to and slightly beyond their positions of Figures 2 and 4. As the arms 30 move upwardly they will engage the inclined edges 56 of the latch members 52 and 53 to cause said latch members to rock clockwise as seen in Figure 4 to permit the arms 30 to pass upwardly and to above the shoulders 55 after which the spring 60 will rock the latch members 52 and 53 counterclockwise into their positions of Figure 4 for positioning the shoulders 55 beneath the arms 30 and so that said weighted arms will be supported thereon. It will be noted that as the lever 45 approaches its full line position of Figure 5, moving from its dotted line position, that the pivot 49 will move across a line forming an extension of a line between the end of the wire 41 which is connected to the yoke 48 and the pivot 46 so that even if the latch members 52 and 53 are inadvertently released the arms 30 will be held in raised positions due to the fact that the pull exerted thereby on the wire 41 will not move the pivot point 49 back across an extension of a line from the wire 41 through the pivot 46 without the operator manually engaging and initially swinging the lever 45 slightly in a counterclockwise direction from its full line position of Figures 2 and 5. Likewise, the spring 71 will normally hold the lever 70 in a position so that the latch members 52 and 53 will be ordinarily held in their operative positions of Figure 4 by the spring 60. As seen in Figures 2 and 5, the end of the bracket 47 to which the lever 45 is connected is laterally offset with respect to the other end thereof so that the tapered end of the lever 45 can be grasped and swung past the bracket 47.

It is to be understood that the parking brake actuator and control has been illustrated and described in conjunction with only one type of conventional vehicle parking brake and that said apparatus is equally adapted for use with parking brakes of the conventional type operating on the transmission or propeller shaft and in which case one end of the cable 17 would be attached to the actuator of this parking brake and the other, forward end of the cable or flexible member 17 would be secured to the eye 19 of the link 18. Various other modifications and changes are likewise contemplated and may obviously be resorted to, without departing from the spirit or scope of the invention as hereinafter defined by the appended claims.

I claim as my invention:

1. A parking brake actuator and control comprising, in combination with a motor vehicle having a parking brake cable connected at its ends to the brakes of the rear wheels of a vehicle and extending forwardly therefrom, a shaft journaled on an axis disposed transversely of the vehicle and supported thereby, said shaft having a crank portion normally disposed to extend in a downward direction, a linkage means connecting said crank to the intermediate portion of the parking brake cable, at least one weighted arm fixed to and extending rearwardly from the shaft and disposed at an angle to the crank, said weighted arm being urged downwardly by gravity to rotate the shaft in a direction for swinging the crank forwardly of the vehicle to cause the linkage means to exert a pull on the parking brake cable for applying the parking brakes, and manually actuated means including a manually actuated lever disposed to be engaged and actuated by the vehicle operator for rotating the shaft in the other direction to swing the weighted arm upwardly and to displace the linkage means rearwardly for releasing the pull exerted thereby on the parking brake cable, said manually actuated means including a rigid member pivotally connected to said lever and having its pivot disposed for movement across a line forming a dead center of the level pivot when said manually actuated lever is moved manually to a position for releasing the parking brake cable, and to provide a means for automatically retaining the weighted arm in a raised, parking brake releasing position.

2. A parking brake actuator and control comprising, in combination with a motor vehicle having a parking brake cable connected at its ends to the brakes of the rear wheels of a vehicle and extending forwardly therefrom, a shaft journaled on an axis disposed transversely of the vehicle and supported thereby, said shaft having a crank portion normally disposed to extend in a downward direction, a linkage means connecting said crank to the intermediate portion of the parking brake cable, at least one weighted arm fixed to and extending rearwardly from the shaft and disposed at an angle to the crank, said weighted arm being urged downwardly by gravity to rotate the shaft in a direction for swinging the crank forwardly of the vehicle to cause the linkage means to exert a pull on the parking brake cable for applying the parking brakes, manually actuated means including a manually actuated lever disposed to be engaged and actuated by the vehicle operator for rotating the shaft in the other direction to swing the weighted arm upwardly and to displace the linkage means rearwardly for releasing the pull exerted thereby on the parking brake cable, and a pivotally mounted latch member supported on the vehicle for engaging under and releasably supporting the weighted arm in an elevated, brake releasing position, and manually actuated latch releasing means associated with said manually actuated lever for swinging the latch member to a released position out of engagement with the weighted arm.

3. A parking brake actuator and control comprising, in combination with a motor vehicle having a parking brake cable connected at its ends to the brakes of the rear wheels of a vehicle and extending forwardly therefrom, a shaft journaled on an axis disposed transversely of the vehicle and supported thereby, said shaft having a crank portion normally disposed to extend in a downward direction, a linkage means connecting said crank to the intermediate portion of the parking brake cable, at least one weighted arm fixed to and extending rearwardly from the shaft and disposed at an angle to the crank, said weighted arm being urged downwardly by gravity to rotate the shaft in a direction for swinging the crank forwardly of the vehicle to cause the linkage means to exert a pull on the parking brake cable for applying the parking brakes, and manually actuated means including a manually actuated lever disposed to be engaged and actuated by the vehicle operator for rotating the shaft in the other direction to swing the weighted arm upwardly and to displace the linkage means rearwardly for releasing the pull exerted thereby on the parking brake cable, a pivotally mounted latch member supported on the vehicle for engaging under and releasably supporting the weighted arm in an elevated, brake releasing position, manually actuated latch releasing means associated with said manually actuated lever for swinging the latch member to a released position out of engagement with the weighted arm, and spring means for normally retaining said latch member in an operative position.

4. A parking brake actuator and control comprising, in combination with a motor vehicle having a parking brake cable connected at its ends to the brakes of the rear wheels of a vehicle and extending forwardly therefrom, a shaft journaled on an axis disposed transversely of the vehicle and supported thereby, said shaft having a crank portion normally disposed to extend in a downward direction, a linkage means connecting said crank to the intermediate portion of the parking brake cable, at least one weighted arm fixed to and extending rearwardly from the shaft and disposed at an angle to the crank, said weighted arm being urged downwardly by gravity to rotate the shaft in a direction for swinging the crank forwardly of the vehicle to cause the linkage means to exert a pull on the parking brake cable for applying the parking brakes, and manually actuated means including a manually actuated lever disposed to be engaged and actuated by the vehicle operator for rotating the shaft in the other direction to swing the weighted arm upwardly and to displace the linkage means rearwardly for releasing the pull exerted thereby on the parking brake cable, a pivotally mounted latch member supporting the weighted arm in an elevated, brake releasing position, manually actuated latch releasing means associated with said manually actuated lever for swinging the latch member to a released position out of engagement with the weighted arm, and spring means for normally retaining said latch member in an operative position, said latch member having a cam surface disposed to be engaged by the weighted arm, when swung upwardly, for initially retracting the latch member to permit the arm to move to a position to be engaged and supported by the latch member.

5. A parking brake actuator and control comprising, in combination with a motor vehicle having a parking brake, linkage means connected to and extending forwardly therefrom for applying the parking brake when a forward pull is exerted on said linkage means, means mounted for forward and rearward swinging movement with respect to the vehicle and to which the forward end of said linkage means is connected, and a weighted arm connected to said swinging means and actuated by gravity for normally causing said swingably mounted means to be swung forwardly for exerting a pull on the linkage means for applying the parking brake, and manually actuated means for swinging the weighted arm upwardly to a brake releasing position.

6. A parking brake actuator and control comprising, in combination with a motor vehicle having a parking brake, linkage means connected to and extending forwardly therefrom for applying the parking brake when a forward pull is exerted on said linkage means, means mounted for forward and rearward swinging movement with respect to the vehicle and to which the forward end of said linkage means is connected, and a weighted arm connected to said swinging means and actuated by gravity for normally causing said swingably mounted means to be swung forwardly for exerting a pull on the linkage means for applying the parking brake, manually actuated means for swinging the weighted arm upwardly to a brake releasing position, and manually releasable spring projected latch means for releasably supporting the weighted arm in a raised position.

WILLIAM F. McSPARRAN, Jr.

REFERENCES CITED

The following references are of record in the file of this patent:

UNITED STATES PATENTS

| Number | Name | Date |
|---|---|---|
| 1,645,124 | Brown | Oct. 11, 1927 |
| 2,007,593 | Brown | July 9, 1935 |